(12) United States Patent
Burns et al.

(10) Patent No.: US 6,571,276 B1
(45) Date of Patent: May 27, 2003

(54) SYSTEM FOR MANAGING ASSET ACCESS IN A DISTRIBUTED STORAGE SYSTEM

(75) Inventors: Randal Chilton Burns, Sunnyvale, CA (US); Atul Goel, San Jose, CA (US); Robert Michael Rees, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/510,784

(22) Filed: Feb. 23, 2000

(51) Int. Cl.[7] .......................... G06F 17/30; G06F 11/30
(52) U.S. Cl. .......................... 709/212; 713/190; 707/8; 709/224; 709/225
(58) Field of Search .............................. 709/212, 225, 709/224; 707/8, 9, 10; 713/190

(56) References Cited

U.S. PATENT DOCUMENTS

| | | | | |
|---|---|---|---|---|
| 4,887,204 A | * | 12/1989 | Johnson et al. | 364/200 |
| 4,965,719 A | * | 10/1990 | Shoens et al. | 364/200 |
| 5,193,188 A | | 3/1993 | Franaszek et al. | 395/650 |
| 5,202,971 A | * | 4/1993 | Henson et al. | 395/425 |
| 5,305,448 A | | 4/1994 | Insalaco et al. | 395/425 |
| 5,339,427 A | * | 8/1994 | Elko et al. | 395/725 |
| 5,490,270 A | | 2/1996 | Devarakonda et al. | 395/600 |
| 5,551,046 A | * | 8/1996 | Mohan et al. | 395/800 |
| 5,615,373 A | * | 3/1997 | Ho | 395/726 |
| 5,867,577 A | | 2/1999 | Patarin | 380/23 |
| 5,956,712 A | * | 9/1999 | Bennett et al. | 707/8 |
| 6,199,141 B1 | * | 3/2001 | Weinreb et al. | 711/118 |
| 6,272,662 B1 | * | 8/2001 | Jadav et al. | 714/805 |
| 6,324,581 B1 | * | 11/2001 | Xu et al. | 709/229 |
| 6,405,315 B1 | * | 6/2002 | Burns et al. | 713/190 |
| 6,466,978 B1 | * | 10/2002 | Mukherjee et al. | 709/225 |

OTHER PUBLICATIONS

B. Walker, G. Popek, R. English, C. Kline, and G. Thiel. "The LOCUS Distributed Operating systems." In Proceedings of the 9th ACM Symposium on Operating Systems Principles, 1983.*

A. D. Birrel and R. M. Needham. "A Universal File Server." IEEE Transactions on Software Engineering. SE6(5), Sep. 1980.*

D. Walsh, B. Lyon, G. Sager, J. Chang, D. Goldberth, S. Kleiman, T. Lyon, R. Sandberg, and P. Weiss. Overview of the Sun Network File System. In Proceeding of the 1985 Winter Usenix Technical Conference, Jan. 1985.*

M. L. Kazar. "Synchronization and Caching Issues in the Andrew File System." In Proceeding of the USENIX Winter Technical Conference, Feb. 1988.*

M. Devarakonda, D. Kish, and A. Mohindra. "Recovery in the Calypso File System." ACM Transactions on Computer Systems. Aug. 1996.*

M. L. Kazar, B. W. Leverett, O. T. Anderson, V. Apostolides, B. A. Bottos, S. Chutani, C. F. Everhart, W. A. Mason, S. Tu, and R. Zayas. "Decorum File System Architectural Overview." In Proceedings of the Summer USENIX Conference, Jun. 1990.*

* cited by examiner

*Primary Examiner*—David Wiley
*Assistant Examiner*—Alina Boutah
(74) *Attorney, Agent, or Firm*—John L. Rogitz

(57) ABSTRACT

A system and method for managing access to assets in a distributed data storage system includes requesting, from a client computer, a semi-preemptible access lock from a server computer. The semi-preemptible lock, if granted, is held by the client computer as long as the server does not demand it back, with the client computer granting open instances under non-preemptible file locks for the asset to which the locks pertain as long as the client computer holds the semi-preemptible lock. When another client computer requests the semi-preemptible lock, the server can demand the lock from the holding client, which relinquishes the lock if no open instances are protected by the lock. Otherwise, the holding client computer first attempts to downgrade its lock to meet the request, and if compatibility is not achieved thereby, the holding client refuses to relinquish the lock.

10 Claims, 3 Drawing Sheets

CLIENT LOGIC FOR PROCESSING
SEMI-PREEMPTIBLE LOCK DEMAND

| LOCK | NAME | ACCESS | SHARING |
|---|---|---|---|
| M | METADATA | METADATA | METADATA, READ, WRITE |
| R | READ | METADATA, READ | METADATA, READ, WRITE |
| S | SHARED | METADATA, READ | METADATA, READ |
| W | WRITE | METADATA, READ, WRITE | METADATA, READ, WRITE |
| U | UPDATE | METADATA, READ, WRITE | METADATA, READ |
| X | EXCLUSIVE | METADATA, READ, WRITE | METADATA |

|   | M | R | W | S | U | X |
|---|---|---|---|---|---|---|
| M | ✓ | ✓ | ✓ | ✓ | ✓ | ✓ |
| R | ✓ | ✓ |   | ✓ | ✓ |   |
| W | ✓ | ✓ | ✓ |   |   |   |
| S | ✓ | ✓ |   | ✓ |   |   |
| U | ✓ | ✓ |   |   |   |   |
| X | ✓ |   |   |   |   |   |

UPGRADES       DOWNGRADES

*SERVER LOGIC*

CLIENT LOGIC FOR PROCESSING
SEMI-PREEMPTIBLE LOCK DEMAND

SYSTEM FOR MANAGING ASSET ACCESS IN A DISTRIBUTED STORAGE SYSTEM

BACKGROUND OF THE INVENTION

1. Field of the Invention

The present invention relates to managing access to assets in distributed data storage systems such as file systems and databases.

2. Description of the Related Art

Distributed file systems are used to provide data sharing in distributed computer systems. Such systems centralize data storage, which improves the scalability and manageability of data access control. Moreover, centralized data storage also facilitates, among other things, easier storage device replacement and data backups, as compared to systems in which data storage is fragmented among local storage devices of many computers. It is to be understood that while, for disclosure purposes, the present discussion focuses on file systems, the principles set forth herein apply equally to other distributed data storage systems, such as distributed database systems.

To synchronize data access such that users share consistent views of shared data, requests from users to read and write data typically are sent to a central file server. The file server then manages access to the data using "locks" to ensure, e.g., that one user is not updating shared data by writing to it while another user might read an out-of-date version of the same data. In distributed systems, locks ordinarily are preemptible, in that the server can demand a lock previously provided by the server to one user to enable the user to access a file, and then give the lock to a second user. Unfortunately, requiring a central server to actively manage all data access degrades performance as compared to accessing a local data cache, since the server essentially represents a bottleneck.

As recognized by the present invention, while a central server can be used to manage synchronized access and coherent views of data, to optimize system performance the server should not be used as a target for all read and write requests. Stated differently, the present invention recognizes that it is desirable to provide local storage system semantics in a distributed environment, wherein communications with a server is minimized where possible. In this way, the speed, ease, and efficiency of accessing assets in a distributed storage network can approach that of accessing data in a local cache. Furthermore, the present invention understands that any asset locking scheme preferably be amenable to simplification, to further improve system performance.

SUMMARY OF THE INVENTION

A general purpose computer is programmed according to the inventive steps herein to manage access to assets in a distributed storage system. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The invention can be implemented by a computer system including at least one general purpose client computer, at least one general purpose server computer, and a distributed data storage system accessible to at least the client computer. The system also includes logic that can be executed by the client computer for undertaking method acts to manage access to assets in the storage system. The method acts undertaken by the client computer include sending a request for a first semi-preemptible access lock from the client computer to the server computer. The access lock can be thought of as a distributed lock that encapsulates local open instances protected by non-preemptible local locks, also referred to as file locks.

Also, the method acts include receiving the first access lock from the server computer, it being understood that the access lock pertains to at least one asset in the storage system. The asset is characterized by either an open state or a closed state. A demand can be subsequently received from the server computer for the first access lock, and the method includes selectively not relinquishing the first access lock if the open state exists for the asset, and otherwise relinquishing the first access lock.

The preferred method undertaken by the client computer includes, if an open state exists for the asset, attempting to downgrade incompatible locks held by the client computer, with the incompatible locks being characterized as being incompatible with the first access lock. The first access lock is not relinquished if any incompatible lock cannot be downgraded.

In another aspect, a computer system includes at least one general purpose client computer, at least one general purpose server computer, and a distributed data storage system accessible to at least the client computer. The system also includes logic that can be executed by the server computer for undertaking method acts to manage access to assets in the storage system. The method acts undertaken by the server computer include receiving a request for a first semi-preemptible access lock from a first client computer, and determining at least whether the first lock is compatible with a second semi-preemptible lock associated with a second client computer. Also, the logic includes granting the request if the first lock is compatible with the second lock, and otherwise demanding the second lock.

In still another aspect, a computer-implemented method for managing access among plural client computers to assets in a distributed data storage system associated with at least one server computer includes issuing semi-preemptible access locks to client computers. In accordance with present principles, the semi-preemptible access locks are conditions precedent for the grant of a file lock to open a file. The semi-preemptible access locks are relinquished upon demand of the server computer when no associated file lock is invoked.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figures 1, 2, 3:
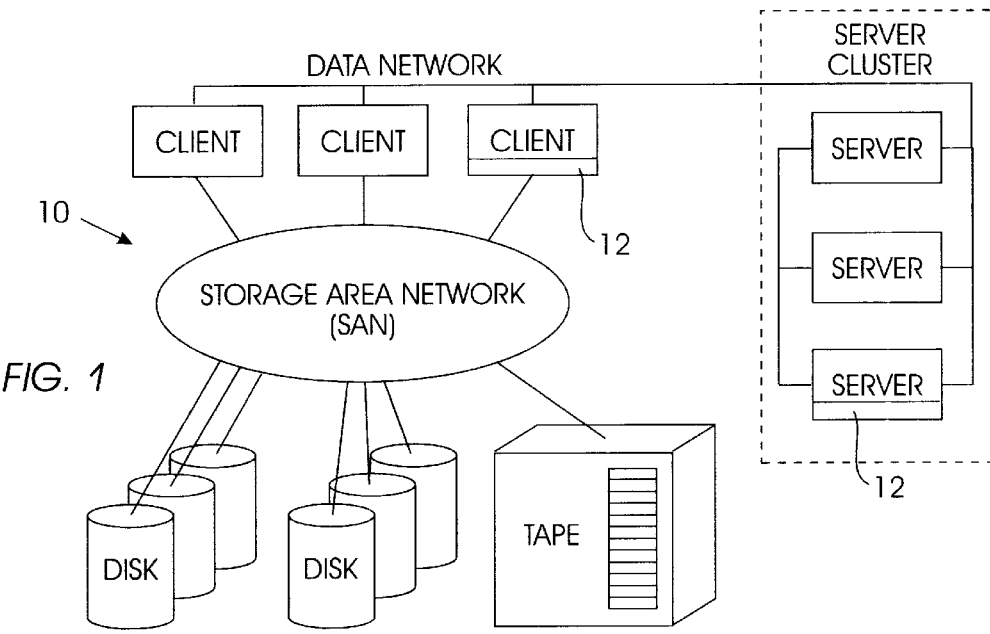
FIG. 1 is a schematic diagram showing the system of the present invention.
FIG. 2 is a table showing lock semantics.
FIG. 3 is a table showing lock compatibilities for an exemplary locking scheme.

Referring initially to FIG. 1, a system is shown, generally designated 10, for managing data access in a distributed data storage system, such as a storage area network (SAN) having associated client computers and at least one server computer. As shown, the system 10 can include a cluster of server computers, and the network can include plural storage disks and tapes and other storage devices. One or more of the disks can be "local" to a client computer, i.e., the client computer manages one or more disks as though the disks were local to the client computer.

In one intended embodiment, the computers of the present invention may be personal computers made by International Business Machines Corporation (IBM) of Armonk, N.Y., or the computers may be any computer, including computers sold under trademarks such as AS400, with accompanying IBM Network Stations. Or, the computers may be Unix computers, or OS/2 servers, or Windows NT servers, or IBM workstations or IBM laptop computers.

The flow charts herein illustrate the structure of the logic executed by the computers of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the flow charts may be embodied in a computer program that is executed by a processor within the computers as a series of computer-executable instructions. These instructions may reside, for example, in a program storage device 12 of the computers. The program storage device 12 may be RAM of the computers, or a magnetic or optical disk or diskette, DASD array, magnetic tape, electronic read-only memory, or other appropriate data storage device. In an illustrative embodiment of the invention, the computer-executable instructions may be lines of compiled C++ compatible code.

Figure 4:
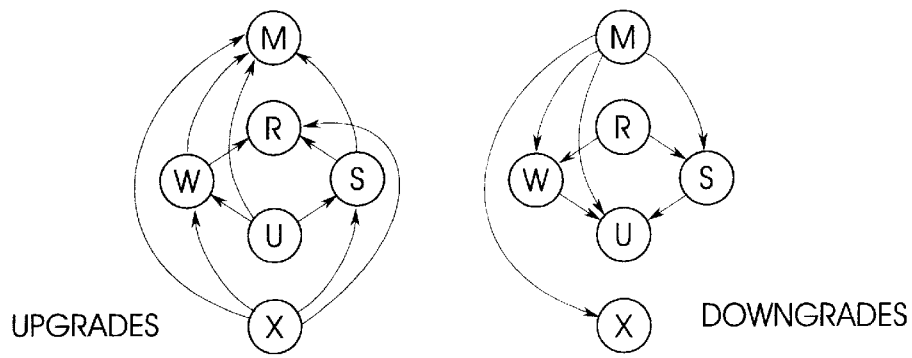
FIG. 4 is a schematic representation of the legal upgrades and downgrades between locks.

To better understand the flow charts described below that illustrate the present invention, reference is first made to FIGS. 2–4. As a preferred but non-limiting example of the types of semi-preemptible access locks that can be used in the present invention, attention is now directed to FIG. 2, which shows a table 14 of locks and lock semantics. It is to be understood that a semi-preemptible access lock of the present invention permits predefined open accesses to assets in the data storage system as long as the semi-preemptible access lock is held by a client computer. That is, to access an asset a client computer first obtains a semi-preemptible access lock, and then, as further described below, the client computer can permit processes to obtain file locks as required to instantiate actual open instances. Once an actual open instance is closed and the file lock relinquished, the client computer nonetheless retains the semi-preemptible access lock to support subsequent open instances until such time as the semi-preemptible access lock is relinquished in accordance with the disclosure below.

As shown, six locks, respectively named "metadata", "read", "shared", "write", "update", and "exclusive" can be provided from which a client computer can select, depending on the type of access to an asset that is desired by the client computer and the types of other concurrent open instances of the asset the client computer is willing to accept.

Accordingly, as indicated in the third column of the table 14, the "M" semi-preemptible access lock can be used to access metadata of an asset under the lock, and when the "M" lock is used another client computer concurrently can access the same asset for any other type of open instance, i.e., READ, METADATA, and WRITE. Furthermore, the "R" lock can be used to obtain read accesses of an asset, and when the "R" lock is used another client computer concurrently can access the same asset for any other type of open instance. On the other hand, when the "S" lock is used, read accesses of an asset can be obtained under the lock, and when the "S" lock is used another client computer can concurrently access the same asset but only for read accesses and metadata accesses.

As further shown in FIG. 2, the "W" lock can be used to obtain both read and write accesses of an asset, with any other concurrent access of the asset by another client computer being permissible. Moreover, the "U" lock can be used to obtain read and write accesses of an asset, and when the "U" lock is used another client computer concurrently can access the same asset but only for read and metadata accesses. On the other hand, when the "X" lock is used, read and write accesses of an asset can be obtained under the lock, and when the "X" lock is used another client computer can concurrently access the same asset but only for metadata accesses. The set of access privileges granted by a lock "L" can be designated "$P_L$". In contrast, the set of sharing privileges restricted by a lock "L" can be designated "$C_L$".

FIG. 3 illustrates a compatibility table 16, which shows which locks are compatible with which other locks. Check marks indicate compatibility. As intended by one preferred embodiment, two locks are compatible with each other if they mutually share the access modes that the other lock protects. Stated differently, in one presently preferred embodiment lock $L_s$ is compatible with lock $L_T$ iff $P_{Ls} \subseteq C_{Lt}$ and $P_{Lt} \subseteq C_{Ls}$.

Thus, for example, the "M" lock is compatible with all other locks that might happen to have been granted, the "R" lock is compatible with all other locks but the "X" lock, the "W" lock is compatible with the "M", "R", and "W" locks, the "S" lock is compatible with the "M", "R", and "S" locks, the "U" lock is compatible with the "M" and "U" locks, and the "X" lock is compatible only with other outstanding "X" locks.

As set forth further below, locks may require upgrading or downgrading. FIG. 4 shows the legal upgrades and downgrades between the MSRWUX locks. For example, as indicated by the arrows the "X" lock can be upgraded to any other lock, the "U" lock can be upgraded to any other lock but the "X" lock, the "W" and "S" locks can be upgraded to the "R" and "M" locks, and the "R" lock can be upgraded only to the "M" lock. In contrast, the "M" lock can be downgraded to any other lock, and the "R" lock can be downgraded to the "W", "S", and "U" locks.

Figure 5:
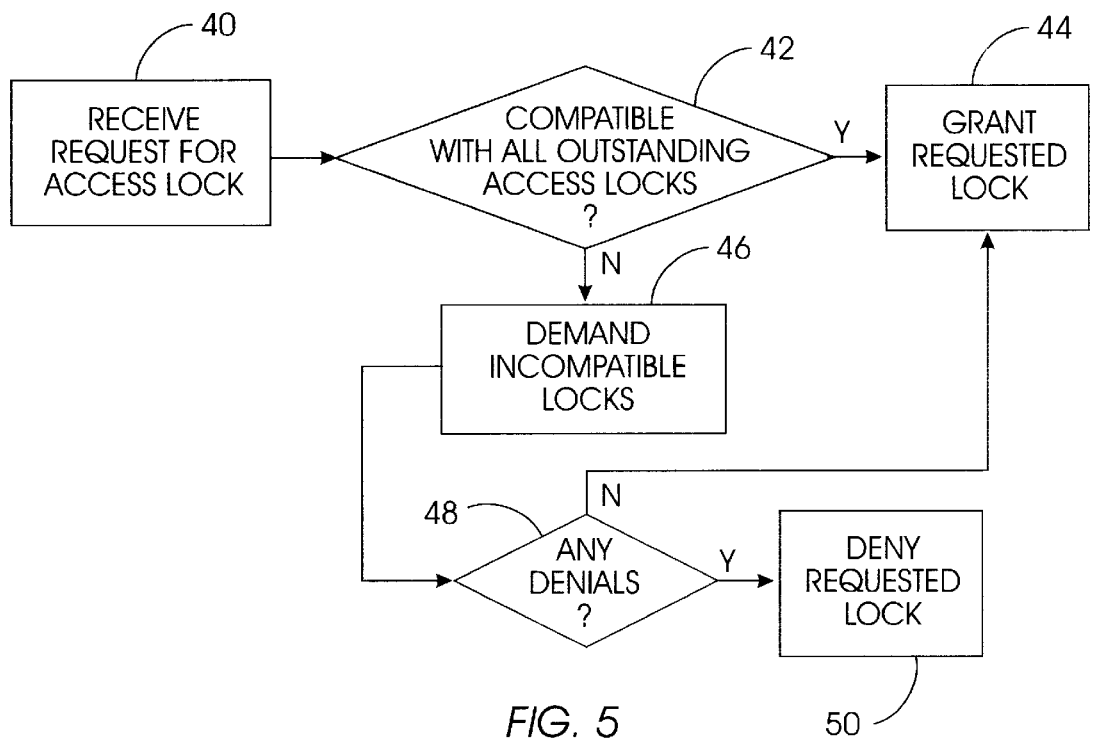
FIG. 5 is a flow chart showing the logic executed by the server computer.

FIG. 5 shows the server logic that is executed when a request for a semi-preemptible access lock $L_R$ is received by the server. Commencing at block 40, a request for an access lock is received. Moving to decision diamond 42, the server determines whether the requested lock is compatible with any other outstanding access lock. If it is determined at decision diamond 42 that the requested lock is compatible with all outstanding access locks, the process moves to block 44 to grant the requested lock.

In contrast, if the test at decision diamond 42 is negative, the logic moves to block 46 to demand all incompatible locks from the client computers that hold those locks. If any denials are received at decision diamond 48, the requested lock is denied at block 50; otherwise, the lock is granted at block 44.

Figure 6:
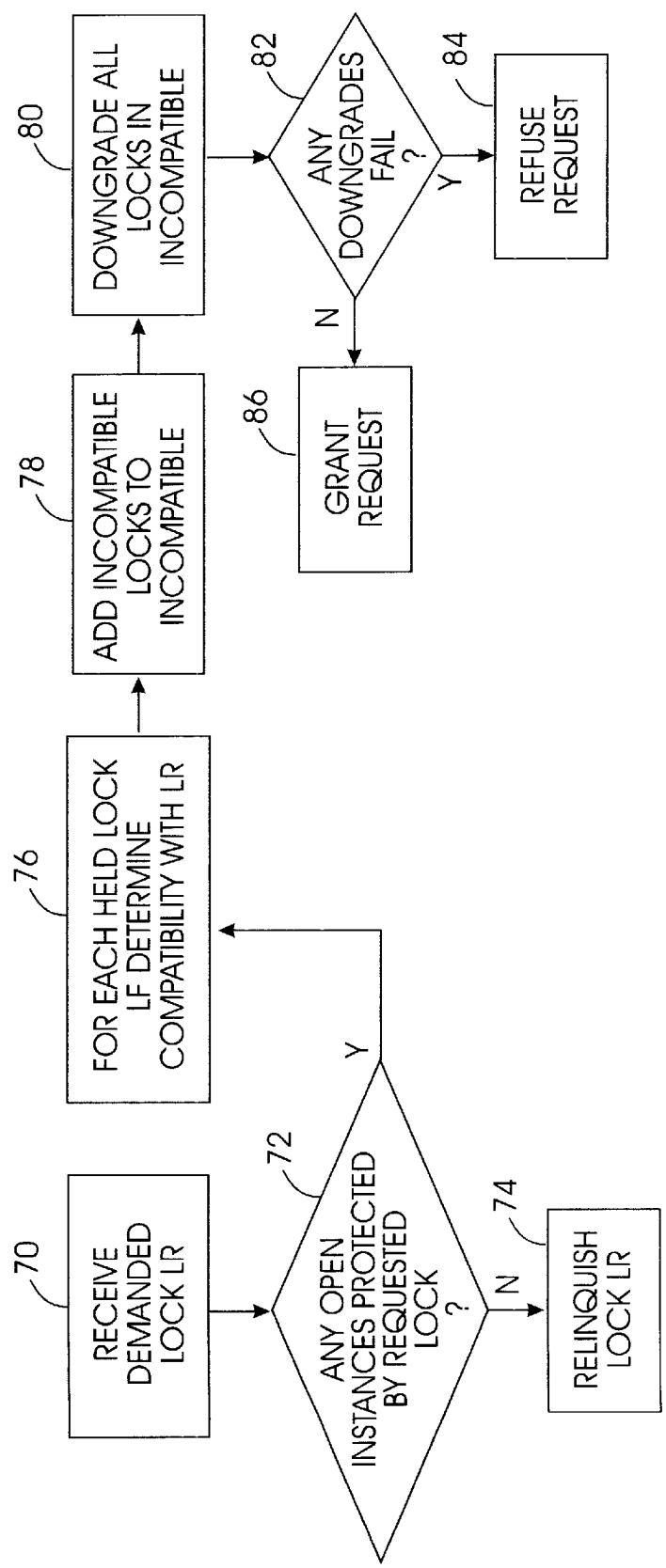
FIG. 6 is a flow chart showing the logic executed by the client computer for processing a demand from the server.

FIG. 6 shows the logic executed by a client computer when a demand for a semipreemptible lock is received from the server. Commencing at block 70, the demand is received, and at decision diamond 72 it is determined whether any open instances exist that are protected by the demanded lock, i.e., whether any children nodes representing local locks exist under the root node representing the demanded lock in the client forest. If not, the lock is relinquished at block 74.

On the other hand, if open instances exist that are protected by the demanded semi-preemptible access lock, the logic flows to block 76 to determine the compatibility of each semi-preemptible access lock held by the client computer vis-a-vis the demanded lock. Proceeding to block 78, all locks that are incompatible with the demanded lock are added to an INCOMPATIBLE list, and then, at block 80, each lock in the INCOMPATIBLE list is attempted to be downgraded in accordance with the downgrades shown in FIG. 4, while still protecting any local instances, i.e., while still encapsulating any local file locks. If it is determined at decision diamond 82 that any downgrades failed, the requested lock is refused to be relinquished at block 84; otherwise, if all incompatible locks can be successfully downgraded as described further below, the client computer relinquishes the requested lock at block 86.

Should a client computer receive a request for a local open instance that requires a stronger access lock than the one held by the client computer, it invokes the logic above to request the required access lock. As recognized herein, the client never needs to upgrade from a held lock to a stronger incompatible lock, because that would mean the client is not using the full strength of its current access lock. Clients address this situation by downgrading their current access lock to an access lock that protects existing open instances, and then upgrading to the needed stronger lock.

While the particular SYSTEM FOR MANAGING ASSET ACCESS IN A DISTRIBUTED STORAGE SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer system, comprising:
   at least one general purpose server computer;
   at least one general purpose client computer;
   a distributed data storage system accessible to at least the client computer; and
   logic executable by the client computer for undertaking method acts to manage access to assets in the storage system, the method acts comprising:
      sending a request for a first access lock from the client computer to the server computer;
      receiving the first access lock from the server computer, the access lock pertaining to at least one asset in the storage system, the asset being characterized by either an open state or a closed state;
      receiving a demand from the server computer for the first access lock; and
      in response to the demand, selectively not relinquishing the first access lock if the open state exists for the asset, and otherwise relinquishing the first access lock.

2. The system of claim 1, wherein the method acts undertaken by the logic further include:
   if an open state exists for the asset, attempting to downgrade incompatible locks held by the client computer, the incompatible locks being characterized as being incompatible with the first access lock; and
   not relinquishing the first access lock if any incompatible lock cannot be downgraded.

3. The system of claim 1, wherein a lock is downgraded to a downgraded lock only when the downgraded lock protects open instances at the client computer.

4. A computer system, comprising:
   at least one general purpose server computer;
   at least first and second general purpose client computers;
   a distributed data storage system accessible to at least the client computers; and
   logic executable by the server computer for undertaking method acts to manage access to assets in the storage system, the method acts comprising:
      receiving a request for a first access lock from the first client computer;
      determining at least whether the first lock is compatible with a second lock associated with the second client computer;
      granting the request if the first lock is compatible with the second lock; otherwise
      demanding the second lock.

5. A computer program device comprising:
   a computer program storage device readable by a client computer; and
   a program on the program storage device and including instructions executable by the client computer for managing access to assets in a distributed data storage system, the program comprising:
      computer readable code means for sending a request for a first semi-preemptible access lock from the client computer to a server computer;
      computer readable code means for receiving the first access lock from the server computer, the access lock pertaining to at least one asset in the storage system, the asset being characterized by either an open state or a closed state;
      computer readable code means for receiving a demand from the server computer for the first access lock; and computer readable code means for selectively not relinquishing the first access lock if the open state exists for the asset, and otherwise relinquishing the first access lock.

6. The device of claim 5, wherein the program further comprises:

computer readable code means for, if an open state exists for the asset, attempting to downgrade incompatible locks held by the client computer, the incompatible locks being characterized as being incompatible with the first access lock; and computer readable code means for not relinquishing the first access lock if any incompatible lock cannot be downgraded.

7. The device of claim 6, wherein a lock is downgraded to a downgraded lock only when the downgraded lock protects open instances at the client computer.

8. A computer program device comprising:

a computer program storage device readable by a server computer; and a program on the program storage device and including instructions executable by the server computer for managing access to assets in a distributed data storage system, the program comprising:

computer readable code means for receiving a request for a first semi-preemptible access lock from a first client computer;

computer readable code means for determining at least whether the first lock is compatible with a second semi-preemptible lock associated with a second client computer;

computer readable code means for granting the request if the first lock is compatible with the second lock; otherwise demanding the second lock.

9. A computer-implemented method for managing access among plural client computers to assets in a distributed data storage system associated with at least one server computer, comprising the acts of:

issuing semi-preemptible access locks to client computers, the semi-preemptible access locks being conditions precedent for the grant of a file lock to open a file, the semi-preemptible access locks being relinquished upon demand of the server computer when no associated file lock is invoked.

10. The method of claim 9, further comprising the act of:

determining at least whether a requested semi-preemptible lock is compatible with an outstanding semi-preemptible lock, and if so, granting the requested lock without demanding the outstanding lock, and otherwise demanding the outstanding lock.

* * * * *